(12) United States Patent
Swinehart et al.

(10) Patent No.: US 9,248,615 B2
(45) Date of Patent: Feb. 2, 2016

(54) COMPACT FIBER OPTIC SENSORS

(75) Inventors: Philip R. Swinehart, Columbus, OH (US); Mokhtar M. Maklad, Westerville, OH (US)

(73) Assignee: KYTON, LLC, Columbus, OH (US)

( * ) Notice: Subject to any disclaimer, the term of this patent is extended or adjusted under 35 U.S.C. 154(b) by 0 days.

(21) Appl. No.: 12/555,006

(22) Filed: Sep. 8, 2009

(65) Prior Publication Data

US 2010/0061678 A1    Mar. 11, 2010

Related U.S. Application Data

(60) Provisional application No. 61/095,885, filed on Sep. 10, 2008.

(51) Int. Cl.
*G02B 6/02* (2006.01)
*G01K 11/32* (2006.01)
*B29D 11/00* (2006.01)

(52) U.S. Cl.
CPC ...... *B29D 11/00663* (2013.01); *G01K 11/3206* (2013.01); *G02B 6/0218* (2013.01); *G02B 6/02209* (2013.01)

(58) Field of Classification Search
USPC ................. 385/12, 32, 37; 264/1.27
See application file for complete search history.

(56) References Cited

U.S. PATENT DOCUMENTS

| | | | |
|---|---|---|---|
| 3,742,731 A * | 7/1973 | Phillips et al. ..................... 63/32 |
| 4,726,650 A * | 2/1988 | Grissom ............... G01P 15/093 385/147 |
| 4,768,854 A | 9/1988 | Campbell et al. |
| 4,856,864 A | 8/1989 | Campbell et al. |
| 4,885,462 A * | 12/1989 | Dakin ................... G01M 11/39 250/227.19 |
| 5,132,529 A * | 7/1992 | Weiss ........................ 250/227.16 |
| 5,138,676 A | 8/1992 | Stowe et al. |
| 5,452,393 A | 9/1995 | Stowe et al. |
| 5,494,236 A * | 2/1996 | Ekholm ......................... 242/539 |
| 5,517,590 A * | 5/1996 | Auborn et al. .................. 385/32 |
| 5,887,107 A * | 3/1999 | Newman et al. ............... 385/137 |
| 6,003,340 A | 12/1999 | Borak et al. |
| 6,118,914 A * | 9/2000 | Davis et al. ...................... 385/37 |
| 6,125,216 A | 9/2000 | Haran et al. |
| 6,134,369 A | 10/2000 | Kurosawa |

(Continued)

FOREIGN PATENT DOCUMENTS

EP    00/28294 A1   5/2000
GB    2 326 471 A   12/1998

(Continued)

OTHER PUBLICATIONS

International Search Report and Written Opinion of the International Searching Authority issued in corresponding PCT Application No. PCT/US2009/056150 (Apr. 19, 2010).

(Continued)

*Primary Examiner* — Andrew Jordan
(74) *Attorney, Agent, or Firm* — Nixon & Vanderhye P.C.

(57) ABSTRACT

A compact, optically double-ended sensor probes with at least one 180° bend provided in the optical fiber in close proximity to a fiber Bragg grating temperature sensor suspends the optical fiber within a casing in such a way that the expansion and contract of the probe casing will not materially influence the temperature reading of the fiber Bragg grating by adding time varying or temperature varying stress components.

30 Claims, 10 Drawing Sheets

(56) References Cited

U.S. PATENT DOCUMENTS

| | | | |
|---|---|---|---|
| 6,205,264 | B1 | 3/2001 | Jin et al. |
| 6,306,516 | B1* | 10/2001 | Jin et al. ............... 428/469 |
| 6,374,014 | B1 | 4/2002 | Jablonski |
| 6,374,041 | B1 | 4/2002 | Asada et al. |
| 6,442,304 | B1* | 8/2002 | Crawley et al. ............ 385/12 |
| 6,586,722 | B1* | 7/2003 | Kenny et al. ........ 250/227.16 |
| 6,677,576 | B1* | 1/2004 | Kenny et al. ........ 250/227.14 |
| 7,187,839 | B2 | 3/2007 | Tourne |
| 7,324,714 | B1 | 1/2008 | Cranch et al. |
| 7,330,624 | B2 | 2/2008 | Isenhour et al. |
| 7,813,598 | B2* | 10/2010 | Mortensen ........... F03D 11/00 385/12 |
| 8,340,482 | B2* | 12/2012 | Arashitani ........... H01S 3/0405 385/137 |
| 2002/0172446 | A1* | 11/2002 | Fernald ................ G01K 5/52 385/12 |
| 2004/0083808 | A1* | 5/2004 | Rambow et al. ............. 73/250 |
| 2006/0024008 | A1* | 2/2006 | Galvanauskas ............ 385/123 |
| 2006/0127024 | A1* | 6/2006 | Smith et al. .............. 385/132 |
| 2008/0085074 | A1 | 4/2008 | Wakahara et al. |
| 2010/0061678 | A1* | 3/2010 | Swinehart et al. ............ 385/12 |

FOREIGN PATENT DOCUMENTS

| | | |
|---|---|---|
| JP | 2000-162444 A | 6/2000 |
| WO | WO 2008/090348 A1 | 7/2008 |

OTHER PUBLICATIONS

D. Viegas et al., "Non-terminal miniature fiber Bragg grating temperature probe based in a u-shape lossless taper," Measurement Science and Technology 21 (2010) 094002 (5pp).

Kim, D.G., et al., "Development of an FBG-Based Low Temperature Measurement System for Cargo Containment of LNG Tankers," Fiber Optic Sensors and Applications, Proc. of SPIE vol. 6770, 6770D (2007).

Extended European search report and European search report in EP 09 813 491.9-1524 (Feb. 15, 2012).

Corning SMF-28e Optical Fiber Product Information, Corning Incorporated, www.corning.com/opticalfiber (Dec. 2007).

Office Action in commonly assigned copending U.S. Appl. No. 12/944,052 (Sep. 29, 2011).

OFS A Furukawa Company, "Measuring NA," 1 page.

Communication mailed Jan. 13, 2014 in European Application No. 09 813 491.9 (4 pages).

Office Action mailed Aug. 6, 2012 in co-pending U.S. Appl. No. 12/944,052.

Office Action mailed Aug. 6, 2012, in co-pending U.S. Appl. No. 12/944,052.

* cited by examiner

Fig. 6B
Oval Tube Example with Bolt Hole End

Fig. 10

Fig. 11

COMPACT FIBER OPTIC SENSORS

CROSS-REFERENCE TO RELATED APPLICATION

This application claims the benefit of priority from provisional application No. 61/095,885 filed Sep. 10, 2008, the contents of which are incorporated herein by reference.

STATEMENT REGARDING FEDERALLY SPONSORED RESEARCH OR DEVELOPMENT

N/A

FIELD

The technology herein relates to fiber Bragg grating optical temperature sensors fabricated in the cores of high-silica optical fibers, and to techniques for making such sensors compact enough in form factor to compete economically with, and be used physically in place of, common small electronic sensors in various applications while preserving their advantages in multiplexing on a single fiber.

BACKGROUND AND SUMMARY

Many or most single mode communications-grade optical fibers and many multi-mode fibers are fabricated from high-silica glass components. Such fibers have a high Young's Modulus, and are termed nearly "perfectly elastic" in addition to possessing very low thermal coefficients of expansion. This combination of properties makes the optical fiber quite stable for communications purposes in the field if precautions are taken to protect it from moisture-caused static fatigue failure, hydrogen diffusion (causing higher absorption of light) and physical forces, among other dangers. Such protection means include, but are not limited to, coating (e.g., during the fiber drawing process) with materials such as acrylates, polyimides, carbon, diamond-like carbon, copper, aluminum and other materials that can be applied to the fiber during the high speed drawing process. These coatings are usually termed "buffer" coatings. Subsequently, the fibers are frequently cabled or jacketed with materials that include strength members (e.g., Kevlar fibers) and jackets for crush and kink protection.

Such fibers often include in their structures at least one core with at least one index of refraction and at least one glass cladding adjacent to the core with at least one index of refraction that is lower that than of the core in order to substantially confine light to the core.

Optical fiber sensors of temperature and/or strain based on common fiber Bragg gratings ("FBGs") can be fabricated in the cores of optical fibers by various means. These gratings are characterized by alternating regions of index of refraction value along a longitudinal length of the fiber core having some pitch, or period. There are several distinct types or varieties of FBGs, including but not limited to short period, long period, blazed and phase shifted gratings. Further, these types can be modified by varying the period (chirp), amplitude (apodizing), index background level and/or physical damage level used to fabricate the gratings. Such damage can be induced by a higher intensity of the FBG fabricating light (usually ultraviolet, or UV lasers; in some cases $CO_2$ or other sources) than is actually necessary to write the grating. The number of cores, core shapes, number of cladding layers, and addition of stress-inducing members can all be varied to control the optical properties for various applications. Different elements can be added to the glass formulation to control the index contrast between the core(s) and the cladding(s).

Advantages of optical sensors over electronic sensors are generally well known, in spite of their present overall greater cost (including the sensor readers). Such advantages include, but are not limited to, immunity to electromagnetic interference (EMI) and electromagnetic pulses (EMP), corrosion resistance, explosion-proof nature, light weight, small size and potential for all-dielectric construction (leading to high voltage compatibility). In addition, sensors based on FBGs enjoy the ability to be multiplexed on a single optical fiber in large numbers by several means, including wavelength division multiplexing (WDM) and optical frequency domain reflectometry (OFDR), leading to a lower cost per sensing point when the cost of the reading instrument is averaged over the number of sensors attached. Further, only a single feedthrough point through bulkheads and pipes is needed for a high sensor count, leading to enhanced ease of installation and lower vulnerability to breach of the bulkhead integrity at the feedthrough. In order to be multiplexed in this way, physically in series along the fiber, the sensors should generally be optically double ended, or have an input fiber and an output fiber (it is understood that the input and output fibers are interchangeable for an FBG). In order to make FBG sensors both small enough to be compatible in form factor with electronic sensors and optically double ended requires innovation beyond the present state of the art.

Most types of FBGs are sensitive to both temperature and strain variables to essentially the same degree for a given type, although the degree of interdependence on the two variables may vary from type to type. Further, if the FBG is fabricated in the core of a high-silica fiber, such as is commonly done, the sensor also has the properties of high Young's Modulus and low coefficient of thermal expansion. These properties generally cause difficulty if the sensor is to be used over a very wide temperature range, if their temperature sensitivities or temperature ranges need to be enhanced beyond that of the simple buffered fiber (by attachment to a material of a higher expansion coefficient), if they will be subjected to rough handling, or firmly mounted to dissimilar materials (to enhance thermal equilibrium with the object to be measured). In addition, fabrication difficulties increase when the effects of strain are to be separated unambiguously from those of temperature and when the sensor is made compact enough to compete with existing electronic sensors in form factor while still maintaining their ability to be multiplexed.

If a section of optical fiber containing an FBG is attached to another object or material (substrate) with adhesive or even thermal grease, the FBG's temperature calibration and even repeatability is significantly and usually adversely affected by all the components of the attachment system, especially over a temperature range of tens or hundreds of degrees Celsius, because of the strain sensitivity of the FBG. If encapsulated in a material such as an epoxy or another material that is not "perfectly elastic" (i.e., a material that is subject to measurable viscous flow), the mechanical stiffness of the fiber causes the fiber to 'creep' or move through the viscous material when stressed by changes in temperature or mechanical causes. This occurs even if the length of the attachment or encapsulation greatly exceeds the length of the FBG itself. In addition, the viscous material itself is often not stable under thermal cycling, especially if it is a glass with a low melting point or is a polymer and its glass transition temperature is exceeded. These effects can lead to variations of temperature calibration of many degrees Celsius from cycle to cycle and even to the loss of optical signal through the gradient-induced breakup of the single reflection peak into multiple peaks (termed accidental chirping, in contrast to the intentional variation of the period of a grating during fabrication).

While it can be very difficult to measure strain without temperature effects, measuring temperature without strain affects can be done with varying degrees of success with appropriate packaging in order to remove the FBG from the effects of stress due to handling or attachment to another object. Although such packaging inevitably increases the dimensions, mass and thermal response times of the FBG sensors, such packaging is necessary to make the sensors of general use in industry. On the other hand, it is extremely desirable to make fiber optic temperature sensor packaging as small and thermally fast as possible, and further to emulate the form factors of commonly used electronic temperature sensors to promote the market acceptance of the newer optical technology in the marketplace.

In order to make the sensors in a physically single ended, 'probe' configuration such as is easily done with thermocouples and thermistors, with both fibers coming out of the same end of a small tube or other package, the fiber may be bent in at least a 180° 'hairpin' curve in a way that avoids losing significant light transmission (a few tenths of a percent per sensor may be permissible in a sensor array of 100 sensors, for example). Conventional communications-grade optical fibers (e.g., Corning SMF-28) begin losing significant amounts of optical transmission when bent in diameters as large as 30 mm.

Figure 1:
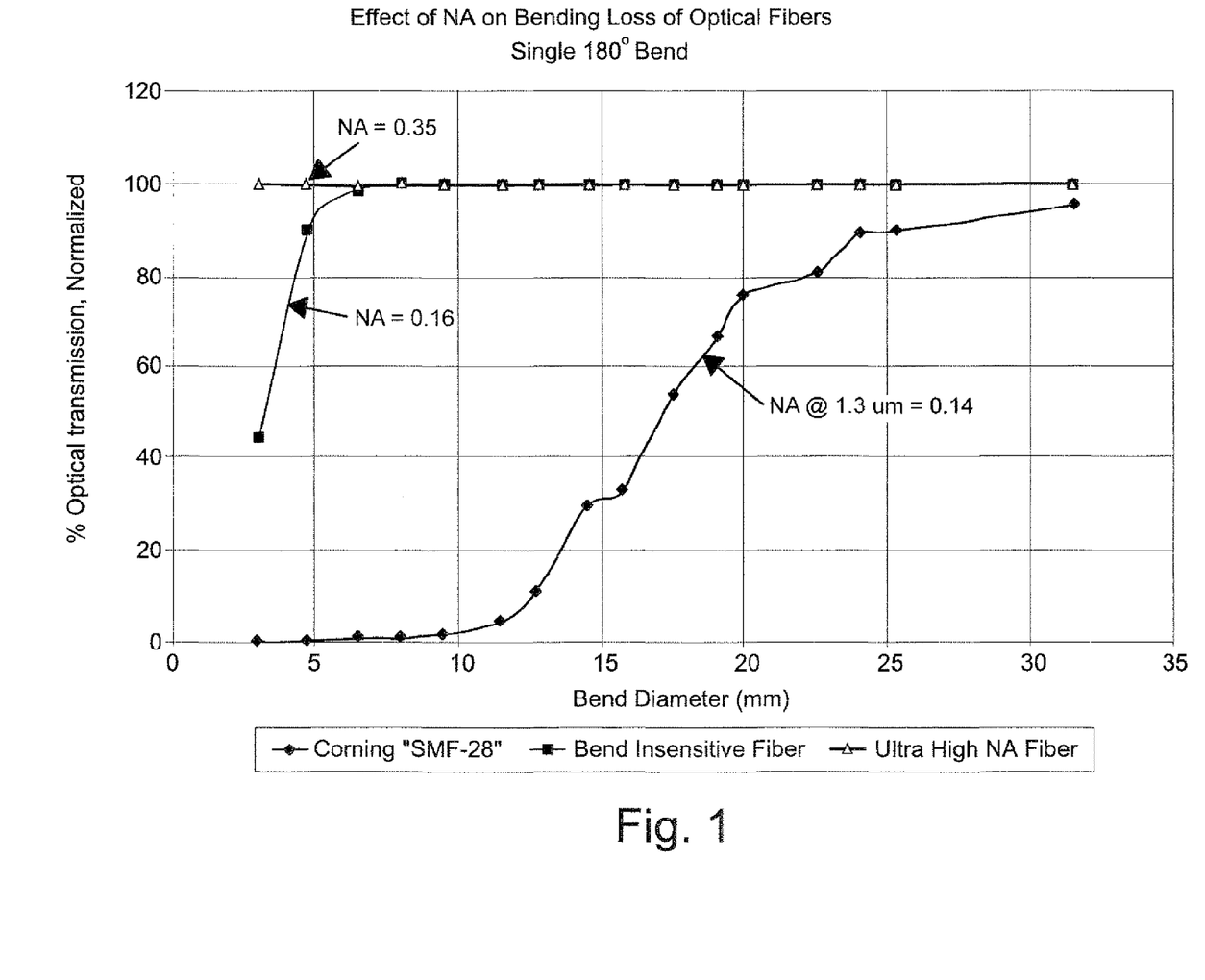
FIG. 1 shows example experimental data on power loss from single 180° bends in three types of optical fibers.

FIG. 1 shows example experimental data on power loss from single 180° bends in three types of optical fibers. For a single sensor on a fiber, losses of 50-90% might be tolerated, but if several are to be multiplexed on a fiber, losses of less than 1% are desirable. From the point of view that multiplexing can be highly beneficial for lowest systems costs, fewest fibers and feedthrough points, etc., it is evident that low loss can be important. FIG. 1 demonstrates that the particular common communications fiber Corning "SMF-28" with a numerical aperture of about 0.14 at 1310 nm (1% power level) generally cannot be used to make a low loss compact sensor, but if the numerical aperture is increased, smaller sensors can be fabricated that are also low loss. This data does not address concerns with the well-known increased static fatigue failure of optical fiber as the bend radius decreases below about 3 mm; it is an illustrative example only of the optical power loss due to the bend. For example, the estimated lifetime of a buffer-coated fiber (that has never been stripped and recoated) bent in a 3 mm radius is greater than 50 years while a bend of 1.5 mm radius would have a failure time measured in hours. To avoid any such increase in fatigue failure for bend radii less than about 2 to 4 mm, thermal bending and annealing of the fiber comprising the bend is desirable. If the thermal process does not induce an adverse chemical or physical change in the core of the fiber, the benefits of the high numerical aperture fiber will be retained and the probability of fiber fracture will be significantly reduced.

In general use, a fiber optic sensor package with a width or diameter of 20-30 mm or greater is highly undesirable. Since electronic industrial sensors frequently are packaged in tubes with diameters of 0.5 to 13 mm, optically double ended, physically single ended fiber optic temperature sensor probes with diameters of 0.3 to a maximum of 13 mm, and preferably 0.3 to 6 mm, will find enhanced utility in industry. This discussion of round or tubular sensor probes does not exclude other cross sectional geometries, such as rectangular or oval cross sections.

The exemplary illustrative technology herein provides compact, optically double-ended sensor probes with at least one substantially 180° bend provided in the optical fiber in close proximity to an FBG sensor. This example non-limiting structure may include for example all versions of at least net 180° bends in definition and bends of somewhat less than 180° that would lead to slightly divergent input and output fibers but still allow a physically single-ended probe configuration within a desired maximum diameter. Further, the FBG sensor can in example non-limiting implementations be suspended in the probe in such a way that the expansion and contraction of the probe casing will not materially influence the temperature reading of the FBG by adding time-or-temperature varying stress components to the FBG. Such time-dependent drift mechanisms that can be avoided include creep in reading (at a constant temperature) that frequently occurs when attempts are made to fasten fibers incorporating FBGs at both ends of the FBG to the casing in a direction substantially on a line with each other, even if said fiber is bent somewhat (substantially less than) 180°) to prevent fiber breakage.

Mechanical 180° bends can be mechanically restrained to force them into a compact form factor if means are employed to prevent such restraints from themselves causing variations in the calibration of the sensors with time and temperature cycling. Thermally formed bends can be made by heating the fiber beyond its softening point utilizing any of the methods of, but not exclusively confined to, a flame, an oven, a hot filament, a glow bar, or a laser, for instance a $CO_2$ laser. The buffer coatings can be removed before heating, burned off during the bending operation or, if an inert atmosphere is employed, an adherent, protective carbon layer can be left on the fiber bend. Reliability of the bend can be enhanced by annealing and slow cooling the bend. Since FBGs in many fibers can be erased by high temperature, the FBG can be of a type that can withstand the temperature of the bending operation, it can be written into the fiber before bending and kept a safe distance away from the bend or the fiber can be loaded with hydrogen after the bending operation and the grating can be written into the bent fiber after the hydrogen loading step.

Additional exemplary illustrative non-limiting features and advantages include:

- A compact optical fiber temperature sensor that is optically double ended and can be made either physically single or double ended as a probe or in-line, respectively, encompassing at least one FBG in close proximity to at least one bend in the fiber comprising at least one net 180° path
- said fiber having a numerical aperture of greater than 0.15
- said FBG further mounted within an outer casing
- the optical fiber is a single mode fiber
- the radius of the smallest at least one net bend is from 0.01 mm to 10 mm and preferably from 0.15 mm to 5 mm
- an arrangement of fiber and FBG is mounted and maintained in physical independence of expansion and contraction of the outer casing, including rubbing on the casing.
- mechanical stress placed upon the outer casing, as in fastening said casing to an object to be measured for temperature, has no or substantially no effect on the temperature calibration of the FBG
- the input and output fibers emerge or can be caused to emerge from the casing essentially at the same end and substantially parallel to each other in a probe configuration
- the application of a bend or bends of greater than 180° or multiple bends can cause the input and output fibers to emerge from the casing at up to 180° from each other (i.e., at 90° or 180° substantially orthogonal or parallel to each other)

said casing contains an atmosphere said casing is environmentally and/or hermetically sealed the at least one FBG is contained in a straight section of fiber within the distance of from 0.01 mm to 100 mm from one end of the at least one 180° bend in the fiber and preferably from 1 mm to 10 mm the at least one FBG is at least partially contained within the at least one net 180° bend in the fiber the FBG is fabricated in un-stripped fiber according to the definition the at least one 180° bend in the fiber is formed by at least one method chosen from the group mechanical bend, thermal bend or tapered bend (per the definitions)

the at least one bend contains at least one length of longitudinally tapered index of refraction, exclusive of the FBG the at least one net 180° bend in the fiber is confined and supported by at least one rigid band across approximately the diameter of the bend and weighing between 10 ng and 10 g, and preferably between 10 μg and 100 mg, such that the weight of the at least one band is supported entirely by the fiber, free of contact with the casing, and further the at least one band moves freely with the fiber within the sensor casing without adding variable stress to the FBG the casing is made entirely of dielectric materials the casing is hermetically sealed the hermetic seal is chosen from one of the group of a weld, a metal alloy solder or sealing glass composition the optical fiber in the area of the hermetic seals is provided with at least one of or a combination of a solderable metal coating, an organic buffer coating or no buffer coating the metal alloy solder contains at least one rare earth element.

the FBG is contained within a 360° bend the 360° bend is substantially circular and the diameter of said circle of fiber is fixed by at least one support at the point of closure of said circle of fiber and which further forces the input and output fibers to emerge substantially tangentially to and near the plane of said circle the length of the FBG is bare (without a buffer coating)

the FBG is protected from damage by at least one support with at least one projection running substantially parallel to the FBG and weighing between 10 ng and 10 g, and preferably between 1 μg and 10 mg said longitudinal support is a tube encompassing the FBG and unattached to the fiber (i.e., floating freely on the fiber)

said tube is attached to the fiber or other portion of the support structure on only one end, and in which the fiber is free to expand and contract independently of said tube the tube is composed of one or more of a metal, metal alloy, glass, ceramic, composite or polymer the atmosphere in the casing contains helium gas for the purpose of enhanced thermal conduction between the casing and the FBG the optical fiber containing the at least one 180° bend is holey fiber, nanostructured fiber or photonic crystal fiber a bend in an optical fiber in which the optical intensity losses are reduced by increasing the index of refraction of the fiber core within only the bend by means of exposure to ultra violet radiation at least over a portion of the length of the bend a bend in an optical fiber in which optical fiber within the bend is subjected to ultraviolet radiation in order to increase its numerical aperture, in which process said deep ultra violet radiation is any combination of constant and varying intensity over the length of the bend.

BRIEF DESCRIPTION OF THE DRAWINGS

These and other features and advantages will be better and more completely understood by referring to the following detailed description of exemplary non-limiting illustrative embodiments in conjunction with the drawings of which.

Note: The drawings herein represent the fiber in two dimensions while assuming a buffer coating is included on the fiber except as noted below.

DETAILED DESCRIPTION

Figure 2A:
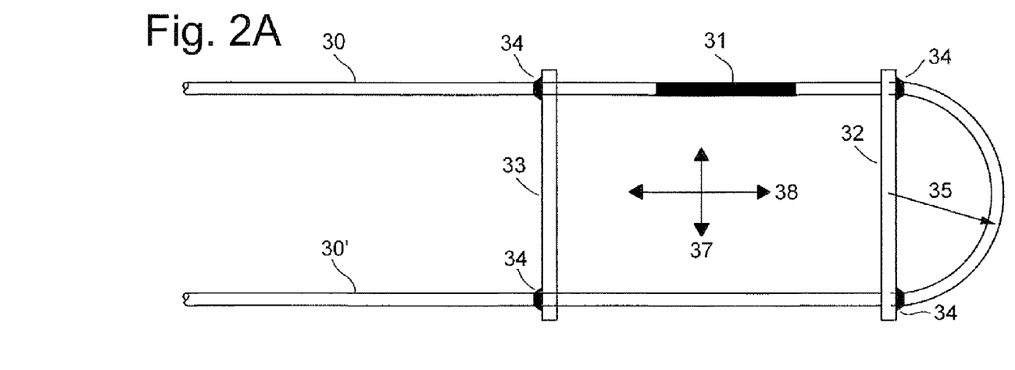
FIGS. 2A-2E show different views of one example illustrative non-limiting example implementation providing a competitively small, physically single-ended and yet optically double-ended, strain-free temperature sensor probe.

FIGS. 2A-2E show different views of one example illustrative non-limiting example implementation providing a competitively small, physically single ended and yet optically double ended, strain-free temperature sensor probe. In FIG. 2A, the input/output fibers 30, 30' shown have numerical aperture greater than 0.15 and a 180° uniform mechanical or thermal bend with uniform radius 35 less than or equal to 10 mm. At least one front brace 32 is provided with its centerline substantially along the diameter of the bend 35 and at least one back brace 33 fixed to the fiber at least at points 34 with a fixative. The purpose of said braces 32, 33 is to maintain the at least one FBG 31 free of longitudinal and/or bending stresses, while being of low enough mass to prevent the fiber from bending substantially in the direction normal to the plane of the 180° bend under gravity or other forces. While said braces 32 and 33 may be of different materials, it is preferable that they be of the same material in order that the expansion and contraction of the braces under thermal cycling will be transferred to the regions outside the banded length containing the FBG, i.e., to the bend 35 and to the length of fiber between band 33 and the casing fiber feedthroughs (see FIGS. 3A-3D), thus further isolating the FBG from effects of the fiber mounting, encasement and the manner of mounting of the casing to the object to be measured. This feature enables the example, illustrative non-limiting FBG to have the buffer layer removed without causing vulnerability to static fatigue fracture or vibration, further enhancing its temperature repeatability by the removal of all dissimilar materials from contact with the FBG. In this manner, the braces may be of a high silica glass that closely matches the fiber thermal expansion coefficient (TCE), a metal, or a polymer that are highly mismatched to the TCE of the fiber. Also indicated are directions 37-39 for which the temperature-induced motion of the FBG is independent of the TCE of its casing and the influence of any object to which the casing is attached, excepting the temperature of said object. The fixative 34 may be for example but non-exclusively an epoxy or other glue (loaded with an inorganic material or completely organic), a melted polymer or fluoropolymer, a ceramic material, or a silica-based sealing glass material If the fiber buffer coating is removed in most of the area between the braces 32, 33, the only material or component affecting the temperature sensitivity and temperature reproducibility of the FBG is the glass fiber itself. Thus in the direction 38, the FBG is not affected even by differential expansion coefficients of a buffer coating and irreproducibilities due to shear forces between the buffer coating and the glass, which can cause slippage or yield and thus cause significant changes in temperature calibration with time. On the other hand, in the directions typified by 37, the braces 32, 33 expand and contract identically, keeping the two legs of the fiber between them parallel and transferring stress to the non-sensing portions of the structure, namely the bend of radius 35 and the fiber lengths between brace 33 and the fiber feedthrough points in the casings 54, such as shown in FIGS. 3A-3D. Thus braces 32, 33 can be made of a material with a much different expansion coefficient than that of the optical fiber, such as for example polyimide.

Figure 2B:
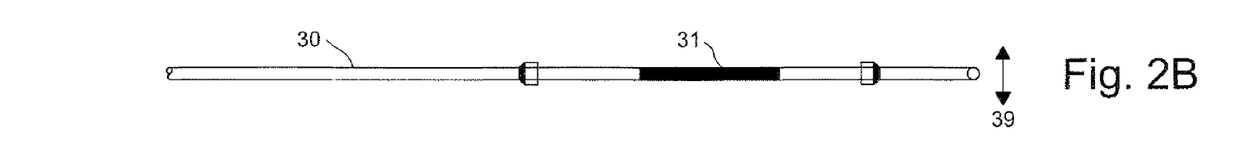

FIG. 2B is an orthogonal view of the assembly shown in FIG. 2A with the addition of the indicated direction 39 in which the fiber is free to move without contact with the casing.

Figure 2C:
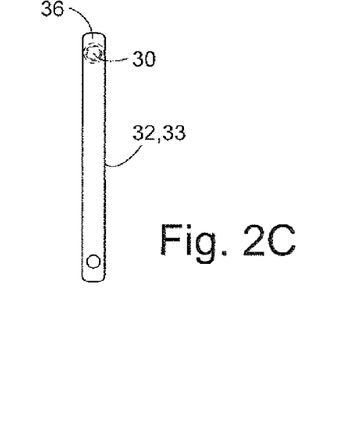

FIG. 2C is one illustrative configuration of braces 32 and 33, which contain the fiber by means of machined holes and a fixative.

Figure 2D:
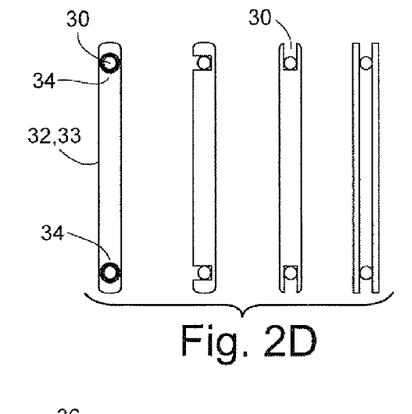

FIG. 2D shows several illustrative configurations of braces 32 and 33, in which the fiber may be contain by means of notches or multipiece configurations. The fixatives are not shown for clarity.

Figure 2E:
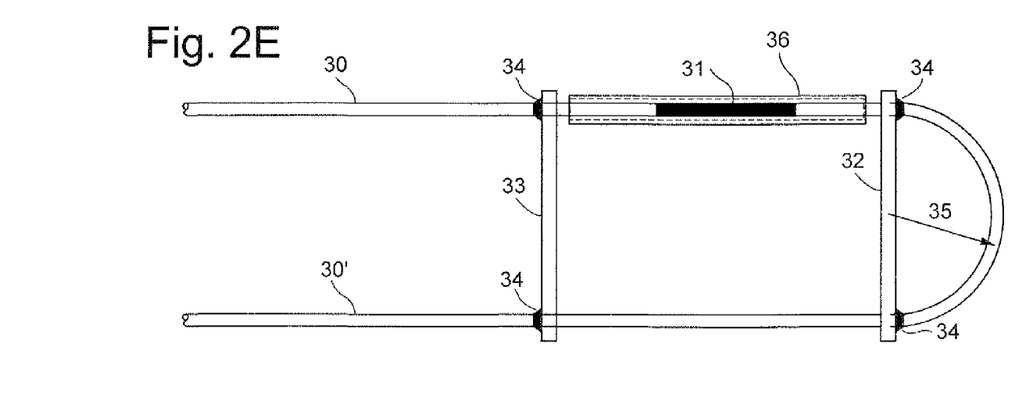

FIG. 2E is the same as FIG. 2A with the addition of further protection of the FBG in the form of a small, light weight tube 36, as non-exclusive examples a metal hypodermic needle tube or a glass capillary tube, which may or may not be round in cross section, which may or may not be of one piece and may or may not be radially symmetrical. Said protection tube may be free to move independently of the fiber expansion and contraction in the direction 38 or may be attached only at one end to the fiber or a brace without influencing the stability or temperature calibration of the FBG. Said protection tube can be suspended free of contact with the area of the fiber containing the FBG, wherein said FBG may or may not have its buffer coating removed, by ensuring that its ends ride on the buffer coating outside the length containing the FBG. Also shown is an end view of the assembly indicating the small radius, light weight nature of the protection tube 36.

FIGS. 3A-3D show illustrative examples of one type of compact casing in which the fiber/FBG assembly of FIG. 2A may be encased and protected. The dimensions of said casing may be, as a non-exclusive example, 1 cm×2 cm×0.4 cm or smaller. The casing 50 may be nonexclusively metal with a cavity 51 to contain and protect the FBG in the bent fiber assembly while allowing said bent fiber assembly to move in any of directions 47, 48 and 49 under thermal stimulus from the environment to be measured without said casing or environment influencing the temperature calibration of the sensor or the reproducibility of the sensor calibration. Said casing 50 may have a metal lid 52 that can be soldered, brazed or welded with lid seal 53, may be ceramic with a glass-frit-sealed lid or polymer with an adhesive sealed or welded lid. Any number of other casing shapes, types and configurations may be equally possible for different applications. Hermetic seals 54 between the fiber 40 and the casing 50 at two points of the casing 50 which are the only two points of contact between the fiber 40 and the casing 50 combine to contain an atmosphere that may non-exclusively contain a partial vacuum, air, an inert atmosphere or a high thermal conductivity gas such as helium. Preferably, said atmosphere will contain at least a partial pressure of helium gas to enhance heat transfer between the suspended fiber assembly and the casing. Said atmosphere will preferably have a boiling point below the lowest intended temperature of operation of the temperature sensor, and could variously contain helium, hydrogen, neon, nitrogen, oxygen, argon, or a hydrocarbon, but should preferably exclude water vapor to slow any fiber static fatigue damage. Said partial pressure of helium gas will be a preferred, high thermal conductivity addition to any atmosphere to provide the widest operating temperature range with the fastest thermal speed.

Figure 3A:
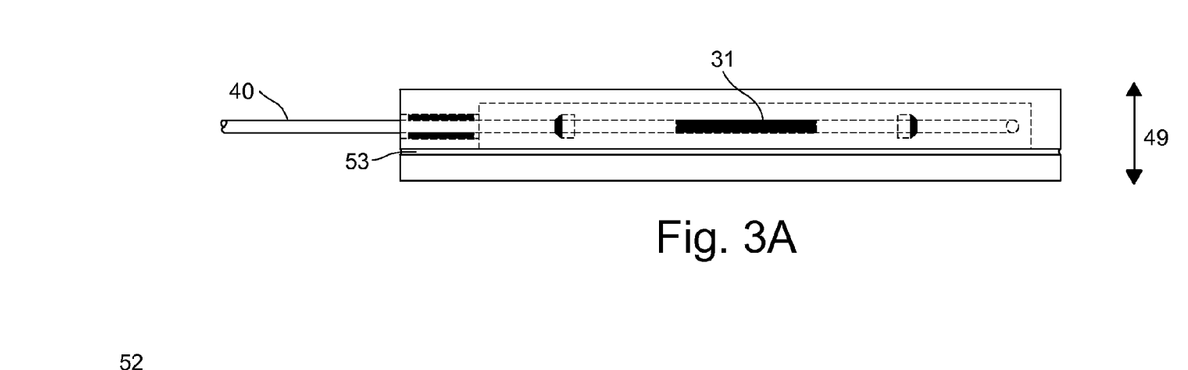
FIGS. 3A-3D show illustrative examples of one type of compact casing in which the fiber/FBG assembly of FIG. 2A may be encased and protected.
Figure 3B:
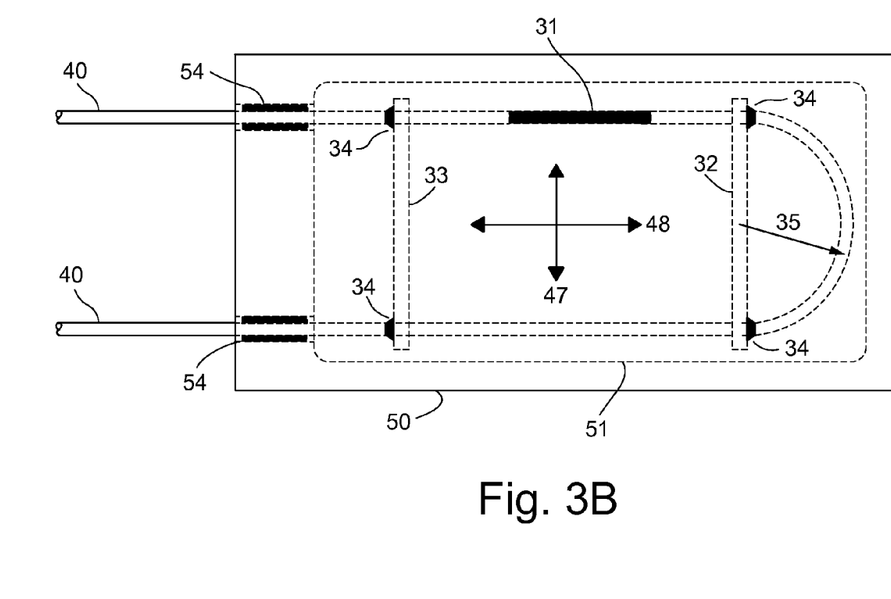
Figure 3C:
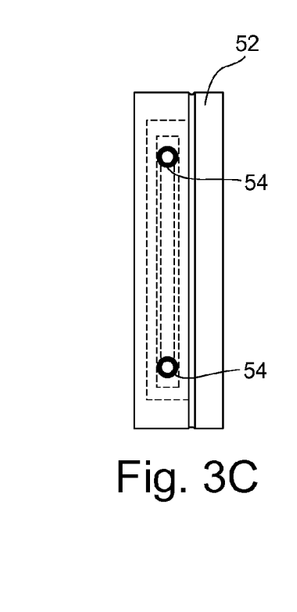
Figure 3D:
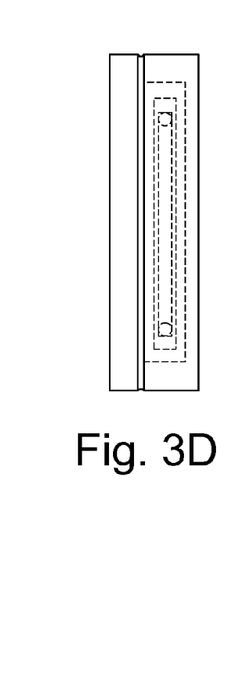
Figure 4A:
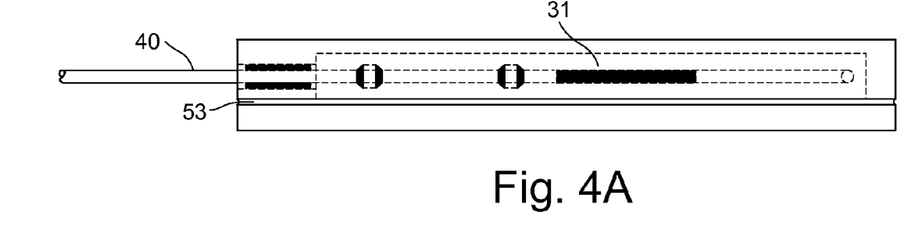
FIGS. 4A-4D show an illustrative example of a fiber bent by thermal means, not requiring a physical restraint means across the diameter of the bend.
Figure 4B:
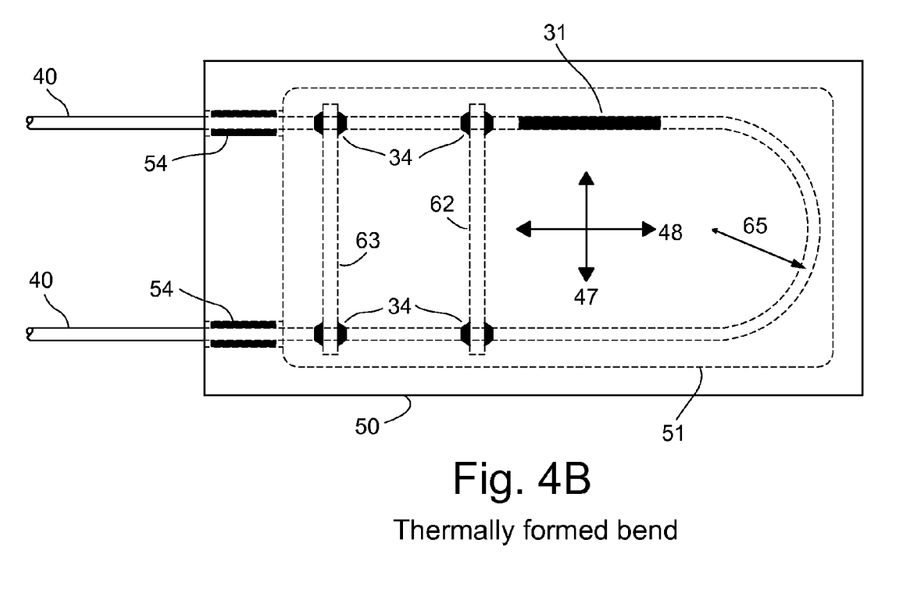
Figure 4C:
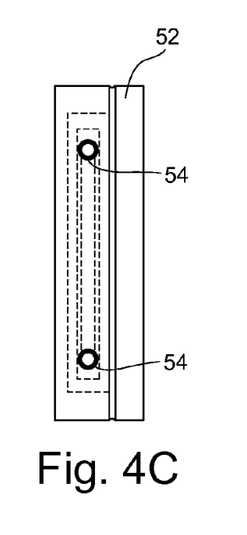
Figure 4D:
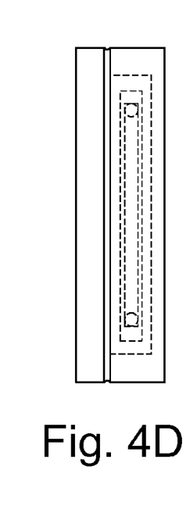

FIGS. 4A-4D show an illustrative example of a bent fiber, FBG temperature sensor utilizing a thermally bent 65, annealed fiber that may or may not require or use the front brace 32, 42 of the mechanically bent fiber assembly shown in FIGS. 2A and 3A respectively, but may utilize at least one brace 62, 63 elsewhere. In this case, the preferred material for the brace or braces will be as low an expansion coefficient material as practical, approaching that of fused quartz, $SiO_2$.

Figure 5A:
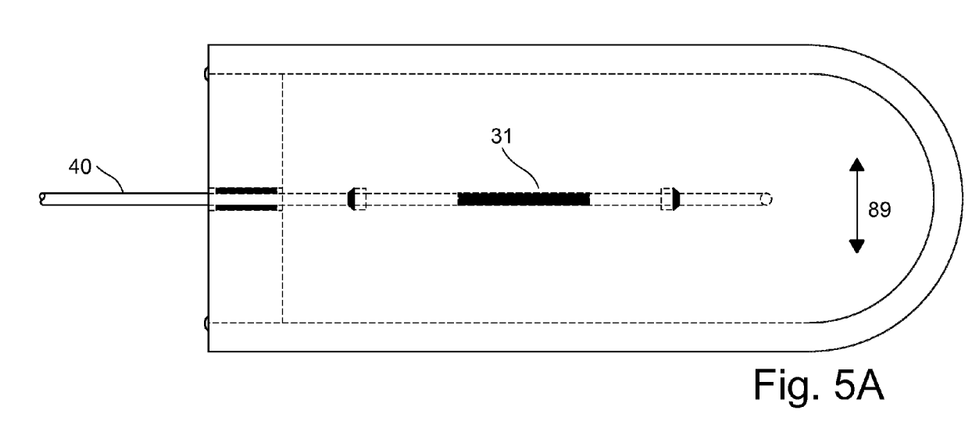
FIGS. 5A-5C show an exemplary illustrative non-limiting implementation of a physically single-ended but optically double-ended bent fiber FBG temperature sensor probe incorporating a cylindrical casing and a desired seal.
Figure 5B:
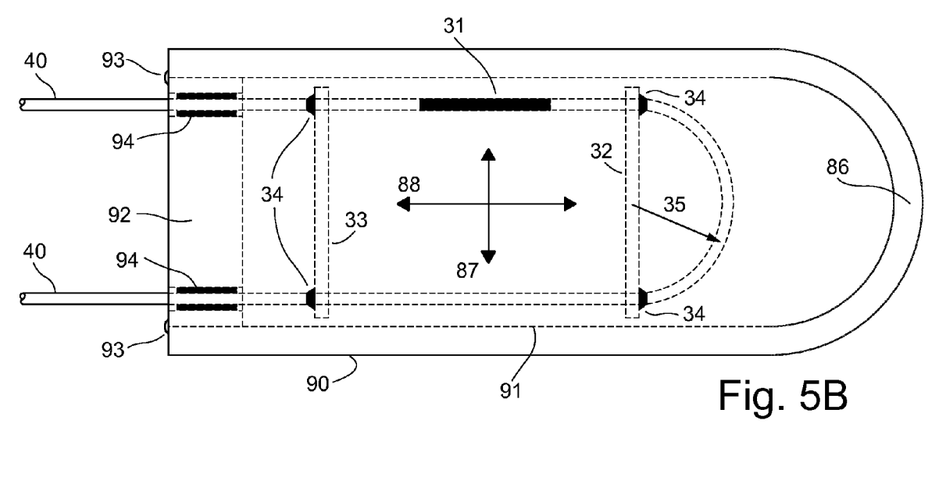
Figure 5C:
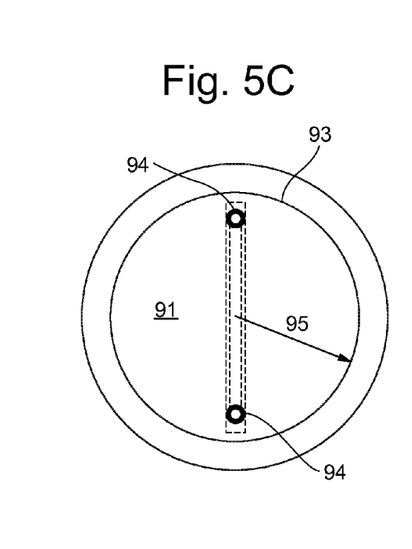

FIGS. 5A-5C show a non-exclusive, illustrative example of a physically single ended but optically double-ended bent fiber FBG temperature sensor probe incorporating a cylindrical casing 90 with a cavity 91 having an inside radius 95 of less than about 8.5 mm and further incorporating a rolled and welded distal seal 86 and a plug 92 that contains fiber feedthroughs 94 and seal 93, all of which may be hermetic. The directions of free motion of the FBG assembly for which said FBG is free of the influence of the casing and outside environment except for temperature are shown as 87, 88, and 89.

Figure 6A:
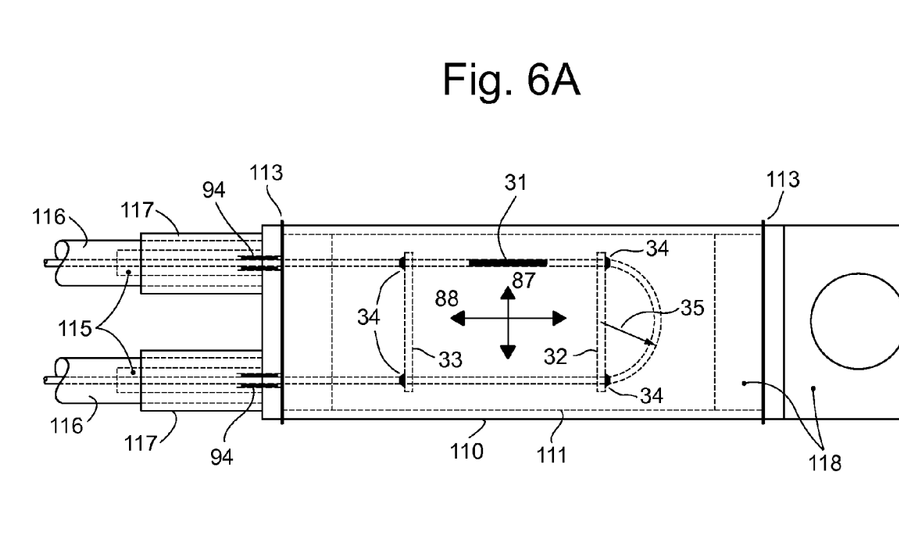
FIGS. 6A-6C show a further exemplary illustrative non-limiting implementation of a physically single-ended but optically double-ended bent fiber FBG temperature sensor probe incorporating a casing with an oval cross-section.
Figure 6B:
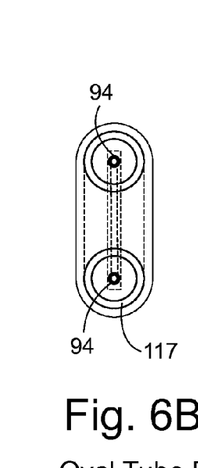
Figure 6C:
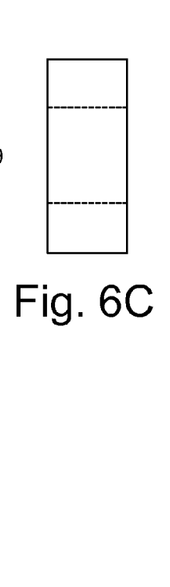

FIGS. 6A-6C show a further non-exclusive, illustrative example of a physically single-ended but optically double-ended bent fiber FBG temperature sensor probe incorporating a casing 110/111 with an oval cross section, which may alternatively be square or rectangular. Said probe casing additionally incorporates a sealed-on distal end 118 which may have a bolt hole 119 for attaching said casing to the object to be measured, or alternately may provide a convenient tab for welding the casing to the object to be measured and is sealed with seal 113. Said casing also additionally illustrates robust terminations 115 attaching cable jackets 116 to the casing by means of crimp connections 117. Said cabling may also contain strength members such as Kevlar fibers and a smaller diameter liner tube though which the optical fibers run.

FIG. 7A-7D show an illustrative example of a miniature FBG loop temperature sensor 121 incorporated into a 360° uniform bend in an optical fiber 120 with radius 125 in a casing cavity 131 through seals 134. Said casing may illustratively have dimensions of 1 cm×1 cm×0.4 cm or smaller and thus will greatly increase the adaptability of FBG sensors for strain free spot temperature measurement. The thermal response of the FBG in this configuration is substantially independent of the influence of the casing 130 and the manner of fixing to the object to be measured. Further, because a single fixing point or brace 123 with only a small amount of fixative 124 is used over only a very small portion of the bend, the fiber loop is free to expand and contract without disruptive influence of the supporting structure. Outside strain influences do not reach the FBG because its diameter is fixed and suspended in the cavity. A slight bend relief 135 between the loop 125a and the casing 130 inside the cavity 131 prevents the expansion and contraction of the casing plus the object to which the casing is attached for temperature measurement purposes from breaking or straining the fiber inside the cavity but outside the loop. This arrangement makes possible a very compact, physically double-ended (in-line) but still optically double-ended configuration. The desired three degrees of strain-free motion 127, 128, 129 for the grating are maintained.

Figure 8:
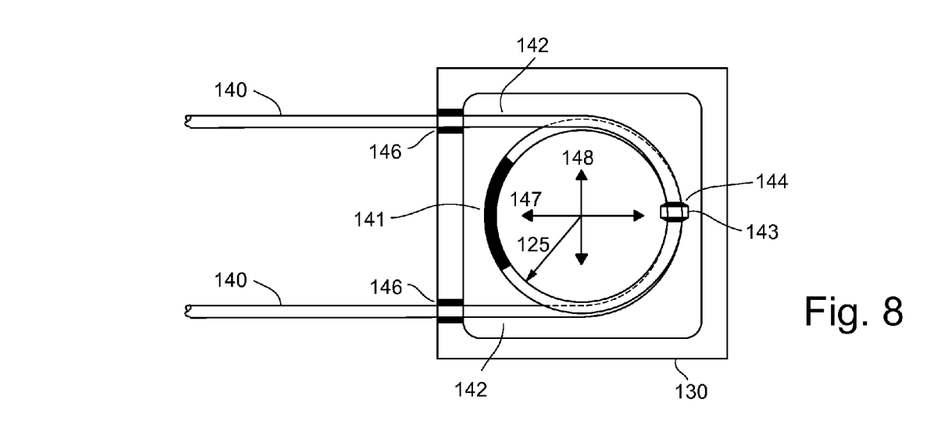
FIG. 8 shows a further exemplary illustrative non-limiting example of a 360° loop sensor incorporating fibers further bent an additional 90°.

FIG. 8 shows a further illustrative example view of a 360° loop sensor 145 incorporating FBG 141 with the fibers 140 further bent an additional 90° each in order to provide a physically single ended but still optically double ended temperature sensor. Said additional 90° bends can be mechanically or thermally formed. Isolation from mechanically induced strain in the direction 148 is provided by the fiber sections 142 between the casing feedthrough points 146 and the fixing brace 143 with fixative 144. Optionally, one or more braces could be added in the fiber sections 142. The freedom-of-motion directions 147,148 are indicated, but the third orthogonal direction is also free of all influences except temperature.

Figure 7A:
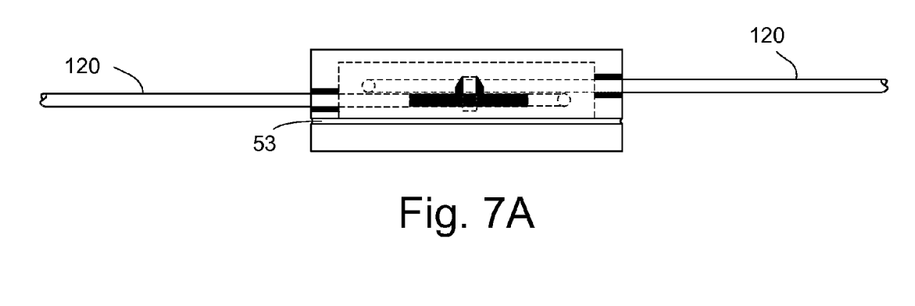
FIGS. 7A-7D show an exemplary illustrative non-limiting implementation of a miniature FBG loop temperature sensor incorporating a 360° uniform bend.
Figures 7B, 7D:
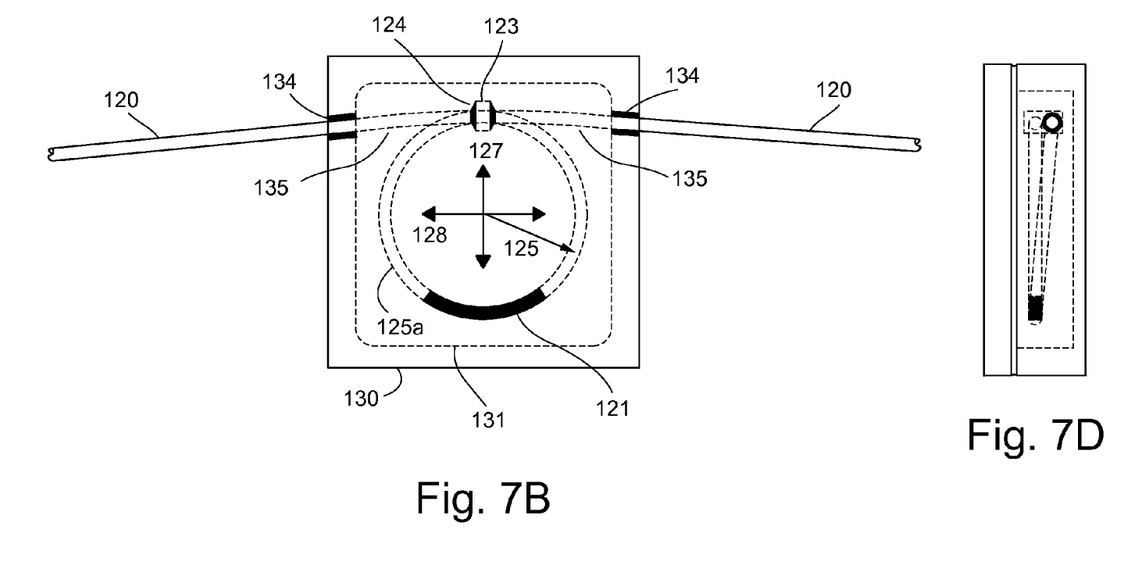
Figure 7C:
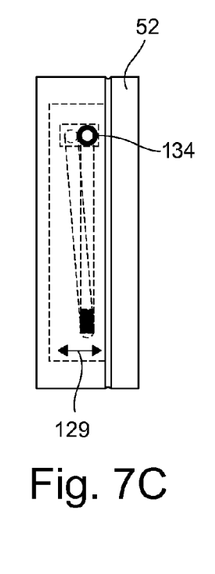
Figure 9A:
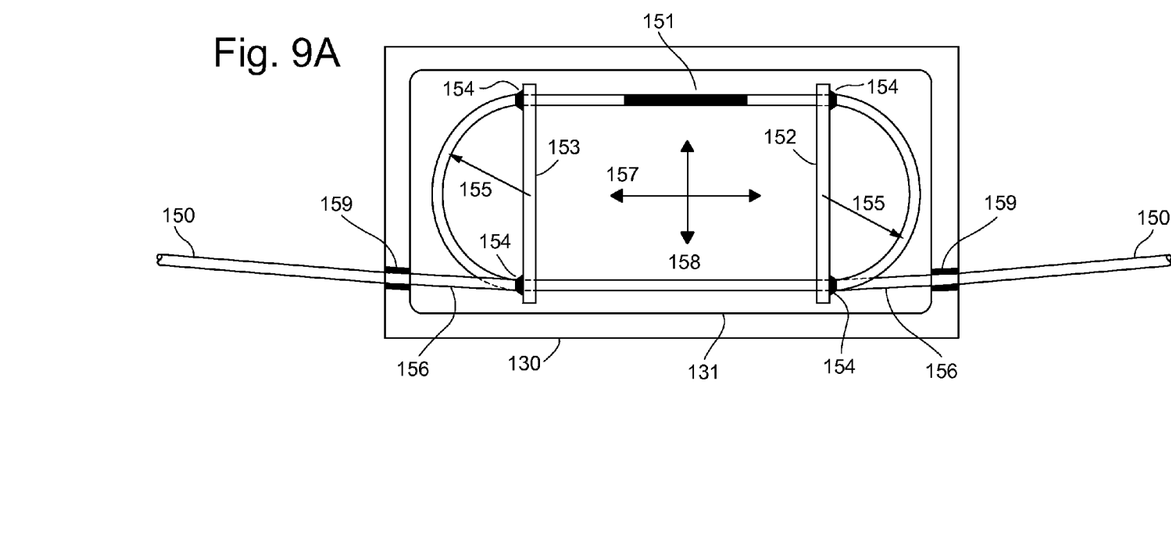
FIGS. 9A and 9B show a further exemplary illustrative non-limiting implementation of a 360° loop temperature sensor in a racetrack configuration.
Figure 9B:
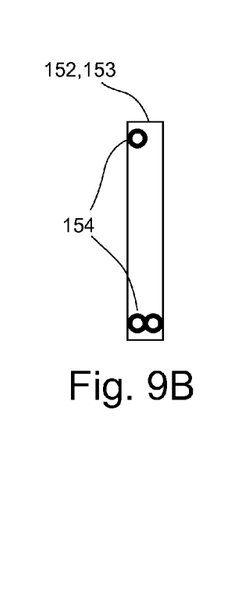

FIGS. 9A and 9B show a further illustrative example of a 360° loop temperature sensor in a race track configuration with the at least one FBG sensor 151 incorporated in a straight section of fiber 150 between two braces 152 and 153 in order to provide a physically double-ended and optically-double ended temperature sensor. Said two 180° bends can be mechanically or thermally formed. The straight sections of fiber captured between braces 152, 153 allow the use of FBGs with the buffer coating removed without danger of static fatigue or stress failures. Isolation from mechanically induced strain is further enhanced by slight bends of radius 155 in the fiber sections 156 between the fixing points 154 and the casing feed through points 159. The critical freedom of motion direction 158 is indicated along with the secondary direction 157. The orthogonal direction of freedom is implied as illustrated in FIG. 7C, feature 129.

Figure 10:
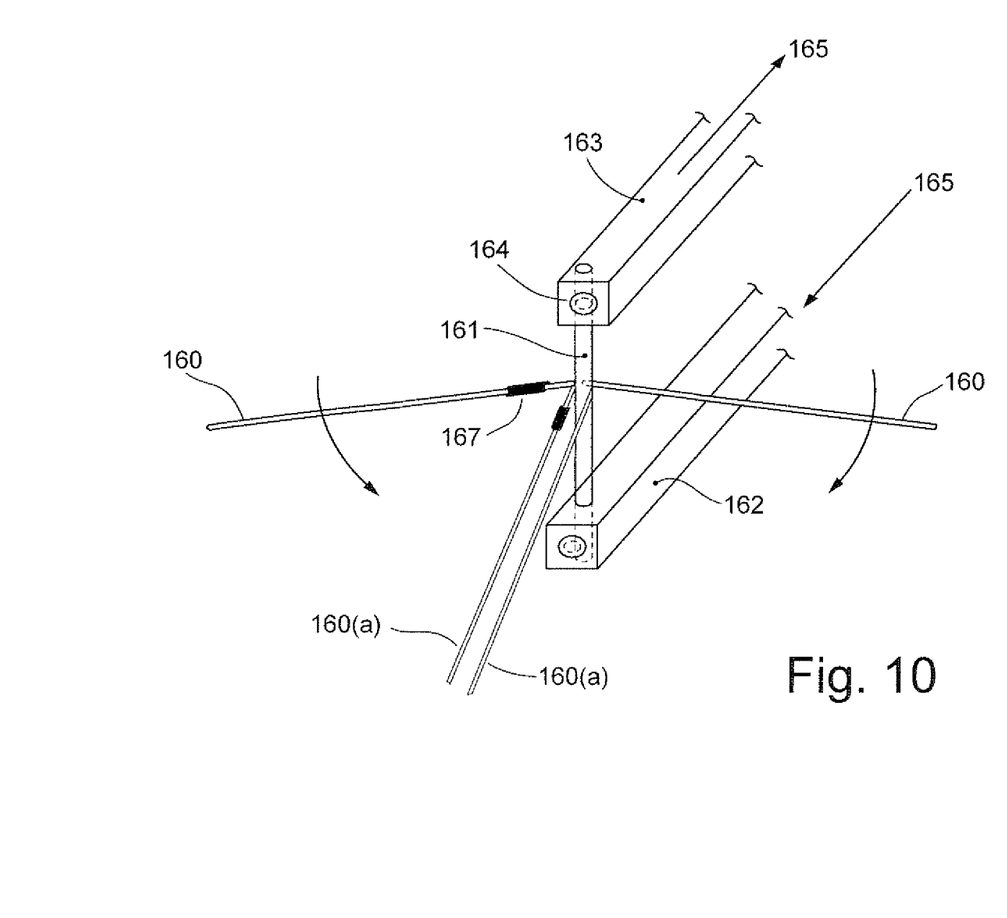
FIG. 10 shows an exemplary illustrative non-limiting implementation of a method of making a permanent, thermally formed bend.

FIG. 10 shows a non-exclusive, illustrative example of a method of making a permanent, thermally formed bend. A self-heated mandrel 161, which may be non-exclusively a graphite, Kanthal™ or Nichrome™ bar or wire, is clamped into buss bars 162, 163 with setscrews 164 or some other means and is heated by current 165. A thermocouple could be welded to the mandrel or an infrared thermometer could be used to monitor the mandrel temperature. Fiber 160 with FBG 167 fabricated in the fiber and is positioned properly for the desired location of the bend. When the mandrel is hot enough, in the neighborhood of 700-1000° C., the fiber is moved to positions 160(*a*) and the mandrel is cooled. The fiber is then removed from the mandrel and the burned-off buffer coating is replaced with the same or another material. Alternately, if the heating is performed in an inert atmosphere, an adherent carbon coating of pyrolyzed buffer coating may be left on the fiber, forming a protective coating. Any braces desired are then added or the fiber is inserted into the casing feedthroughs and affixed to the casing. A 360° C. bend containing a high temperature-tolerant grating can be accomplished in the same manner, or the grating can be written in the fiber after bending.

Figure 11:
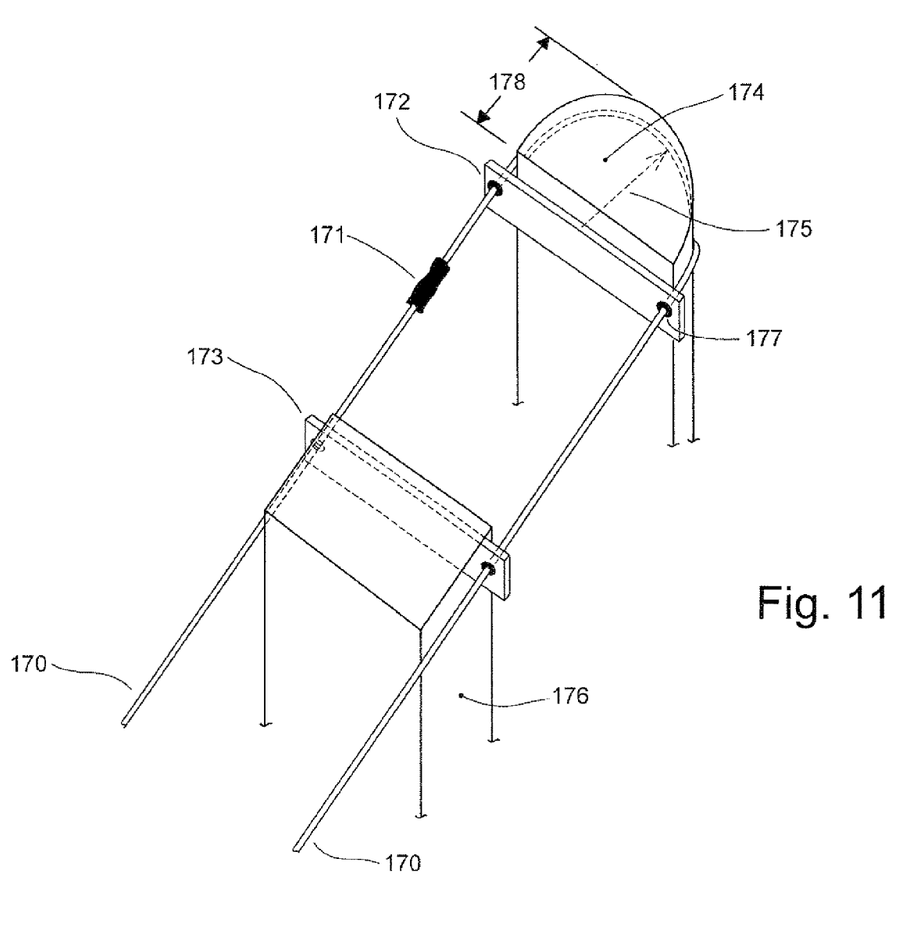
FIG. 11 shows an exemplary illustrative non-limiting implementation of a method of making a mechanical bend and applying mechanical constraints.

FIG. 11 shows a non-exclusive, illustrative example of a method of making a mechanical bend. Two posts 174 and 176 are rigidly supported in relation to each other in a fixture and are used to form the fiber 170 containing the FBG 171 and position the braces 172, 173 for the application of the fixative 177 at each point where the fiber is to be attached to the braces. The radius of post 174 is that of the desired fiber bend 175. The distance 178 can be reduced by one half the thickness of the brace 172 to center the fiber bend support at the diameter of the bend, or alternately the post 174 need not be half-round in order to make desired manipulations of the fiber configuration. The braces 172 and 173 can further be clipped to the posts 174, 176 and other positioning and supporting elements 177 can be added as necessary to prevent the fiber and braces from moving and to make the fabrication process efficient and accurate. It is highly desirable in one example non-limiting implementation to prevent the assembly from twisting so the fiber no longer lies in a single plane. The fixture can for example be inserted into an oven to cure the fixative. The sensor is then removed from the fixture and inserted into its casing.

SOME DEFINITIONS

Index contrast: The difference between the higher index of refraction of the fiber core and the lower index of refraction of the fiber cladding.

Bend-sensitive fiber (high loss with reference to bending): Numerical aperture lower than or equal to 0.15, usually designed to be low loss in both the 1300 nm and 1550 nm wavelength bands—common communications fiber (e.g., Corning SMF-28 or 28e™)

Bend-insensitive fiber (low loss with reference to bending): Numerical aperture of greater than 0.15.

Holey fiber (sometimes called a photonic crystal or photonic bandgap fiber): High numerical aperture fiber in which the high index contrast is provided by an array (usually a geometrically regular array) of holes in the cladding around the core of the fiber, and running parallel to the core throughout the length of the fiber. May have a hollow core.

Nanostructured fiber: Fiber with a ring of nanostructures around the core that produces the effect of a high numerical aperture fiber but allows a larger mode field diameter than bend insensitive fiber and good transmission in a wider band of wavelengths (e.g., Corning Photonics ClearCurve® optical fiber made with nanoStructures™ technology; approximately 1285-1625 nm). Much smaller radius bends are possible than with the same company's SMF-28e™ fiber, but it is still fully compatible with SMF-28e™.

Uniform bend: A bend in the fiber made by mechanical or thermal means without changing the diameter of the fiber materially.

Mechanical bend: A bend made with mechanical force and maintained with a mechanical constraint that is mechanically stiff but light weight and small enough to move with the fiber without causing dragging on the case or distortion to the FBG signal.

Thermal bend: a bend in the fiber made by heating it thermally above its softening point to permanently form the bend in a stress-free condition without materially affecting the fiber diameter, after which the bend can be recoated with a buffer coating to protect it.

Tapered or drawn bend: A bend in the fiber made by thermally heating the fiber above its softening point, stretching it so its diameter tapers smoothly (adiabatically) to a minimum and smoothly returns to the original diameter, afterward forming at least one 180° bend either mechanically or by further thermal treatment. Minimum diameter of a few microns can reduce optical intensity losses to a few percent or less by causing the light to be guided in the remaining glass with air as the 'cladding' (air-guided fiber).

180° bend: Includes bends in the fiber that are of constant radius, a mix of different radii and straight sections, a piecewise linear, segmented circle, an angle or a circle segment that is more than 180° or somewhat less than 180°.

UV flood: Subjecting the length of a fiber bend to a fluence of deep ultraviolet radiation of sufficient intensity such that the index of refraction of the fiber core is increased above the original index of refraction of the fiber core and over the entire length of the bend, thus increasing the numerical aperture and reducing the loss of light intensity of the signal light in the fiber core.

Un-stripped grating: An FBG that is written during the fiber drawing process before the buffer coating is applied or is written through a buffer coating without stripping and recoating the buffer.

Optically double ended sensor: Sensor with two optical fibers emerging from the casing, in any direction, with either fiber being useable as the input or the output fiber and able to operate either in reflection or transmission.

Optically single ended sensor: Sensor with only one fiber entering the casing and able to operate only in reflection.

Physically double ended sensor: Sensor with the input and output fibers emerging from the casing at substantially opposite ends and substantially parallel.

Physically single ended sensor: Sensor in a probe configuration with both fibers emerging from the sensing portion of the casing substantially in the same direction Fixitive: A material or method of producing a hard, rigid attachment of an optical fiber to another structure or material.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. A compact optical fiber temperature sensor comprising:
   an optical fiber including one or more bends on the order of 180 degrees each with a radius of curvature not in excess of 10 mm;
   a fiber Bragg grating defined on or in an uncoated portion of said optical fiber in proximity to or within said bend or bends; and
   a casing that at least partially encases said fiber and includes two points of penetration of the optical fiber through the casing that are the only two points of contact of said fiber with said casing,
   at least one brace within the casing, said at least one brace attached to said fiber at two points with the fiber Bragg grating fiber therebetween, the at least one brace being further arranged to isolate the fiber and fiber Bragg grating from stresses due to temperature-dependent expansion and contraction of the casing so as to not materially influence the fiber Bragg grating by causing temperature-varying axial, radial or bending stress components, said at least one brace being further arranged to reduce vulnerability of the uncoated portion of said optical fiber to static fatigue fracture or vibration, wherein
   said optical fiber including said Bragg grating, at least one brace and said bend or bends is suspended from the casing against gravity in all directions.

2. The sensor of claim 1 wherein the fiber including the at least one brace supports itself in such a way that mechanical stress placed upon the casing has substantially no effect on temperature calibration of the fiber Bragg grating.

3. The sensor of claim 1 wherein said radius of curvature of said bend is in the range of from 0.10 mm to 5 mm.

4. The sensor of claim 1 wherein said optical fiber includes first and second portions that emerge from the casing at any angle to each other by the continuation of the bend angle to greater than said substantially 180 degrees.

5. The sensor of claim 4 wherein the first and second portions emerge from the casing parallel from the same side or end, parallel at the opposite side or end, or at 90 degree to each other.

6. The sensor of claim 4 wherein the first and second portions that emerge from said casing substantially orthogonally to one another.

7. The sensor of claim 4 wherein the first and second portions that emerge from said casing substantially parallel to each other.

8. The sensor of claim 1 wherein said casing contains an atmosphere.

9. The sensor of claim 1 wherein said casing is environmentally sealed.

10. The sensor of claim 9 wherein said environmental sealing comprises an adhesive.

11. The sensor of claim 10 wherein said adhesive comprises epoxy.

12. The sensor of claim 1 wherein said casing is hermetically sealed.

13. The sensor of claim 12 wherein the hermetic seal is chosen from one of the group consisting of a weld, a metal alloy solder or sealing glass composition.

14. The sensor of claim 13 wherein the hermetic seal comprises at least one rare earth element metal alloy solder.

15. The sensor of claim 12 wherein the optical fiber in an area of the hermetic sealing is provided with at least one of or a combination of a metal coating, a solderable metal coating, an organic buffer coating or no coating.

16. The sensor of claim 1 wherein the fiber Bragg grating is contained within a 360° bend of said fiber.

17. The sensor of claim 16 wherein the 360° bend is substantially circular and the diameter of said circle of fiber is fixed by at least one support at the point of closure of said circle of the fiber and which further forces the input and output fibers to emerge substantially tangentially to and near the plane of said circle.

18. The sensor of claim 1 wherein at least the portion of the fiber defining the fiber Bragg grating has no coating or protection other than the casing.

19. The sensor of claim 1 wherein the casing contains one or more of helium gas and neon gas that enhances thermal conduction between the casing and the fiber Bragg grating.

20. The sensor of claim 1 wherein the optical fiber comprises holey fiber, nanostructured or photonic crystal fiber.

21. The sensor of claim 1 wherein the at least one fiber Bragg grating is disposed on a straight section of said fiber within a predetermined distance from said bend.

22. The sensor of claim 1 wherein the at least one fiber Bragg grating is contained in a straight section of fiber within the distance of from 0.01 mm to 100 mm from one end of the bend.

23. The sensor of claim 1 wherein the fiber Bragg grating is at least partially contained within the bend.

24. The sensor of claim 23 wherein the fiber Bragg grating is fabricated in un-stripped fiber.

25. The sensor of claim 1 wherein the bend or bends contains at least one length of longitudinally tapered index of refraction, exclusive of the fiber Bragg grating.

26. The sensor of claim 1 wherein the casing is made entirely of dielectric materials.

27. The optical fiber temperature sensor of claim 1 wherein the bend or bends is formed by thermal bending.

28. The optical fiber temperature sensor of claim 1 wherein the bend or bends is formed by tapered bending.

29. A compact optical fiber sensor comprising:
an optical fiber including one or more bends on the order of 180 degrees each with a radius of curvature not in excess of 10 mm;
a fiber Bragg grating defined on or in said optical fiber in proximity to or within said bend or bends; and
a casing that at least partially encases said fiber, the casing having therein at least one brace within the casing, said at least one brace being further arranged to isolate the fiber Bragg grating from mechanical stress caused by temperature-dependent dimensional changes of the casing, said at least one brace being further arranged to reduce vulnerability of the fiber Bragg grating to static fatigue fracture or vibration; wherein
said optical fiber that includes said Bragg grating, said at least one brace and said bend or bends is attached to the casing only at points of the casing, the at least one brace being in the interior of the casing and having an axis parallel to one axis of the casing, so that said optical fiber including said Bragg grating, said at least one brace and said bend or bends expands and contracts freely with temperature changes along three directions inside the casing without contacting the casing, wherein
said optical fiber that includes said Bragg grating, said at least one brace and said bend or bends is suspended from the casing against gravity in all directions, and
wherein the bend or bends is formed by at least one of mechanical bending, thermal bending and tapered bending.

30. A compact optical fiber sensor comprising:
an optical fiber including a thermally-created bend or bends on the order of 180 degrees each with a radius of curvature not in excess of 10 mm;
a fiber Bragg grating defined on or in an uncoated portion of said optical fiber in proximity to or within said thermally-created bend or bends; and
a casing that at least partially encases said optical fiber and includes at least one brace within the casing, said at least one brace being further arranged to isolate the optical fiber and fiber Bragg grating from stresses due to temperature-dependent expansion and contraction of the casing so as to not materially influence the fiber Bragg grating by causing temperature-varying stress components, said at least one brace being further arranged to reduce vulnerability of the uncoated portion of said optical fiber to static fatigue fracture or vibration, wherein
said optical fiber that includes said Bragg grating and said bend or bends is attached to the casing only at two points of the casing, the at least one brace being in the interior of the casing and having an axis parallel to one axis of the casing, so that said optical fiber including said Bragg grating, said at least one brace and said bend or bends moves freely along three directions inside the casing without contacting the casing, wherein
said optical fiber that includes said Bragg grating, said at least one brace and said bend or bends is suspended from the casing against gravity in all directions.

* * * * *